United States Patent
Li et al.

(10) Patent No.: US 8,941,367 B2
(45) Date of Patent: Jan. 27, 2015

(54) SWITCHING REGULATOR AND THE METHOD OF GENERATING A PEAK CURRENT SIGNAL FOR THE SWITCHING REGULATOR

(71) Applicant: Chengdu Monolithic Power Systems Co., Ltd., Chengdu (CN)

(72) Inventors: Yike Li, Chengdu (CN); Li Xu, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 13/961,450

(22) Filed: Aug. 7, 2013

(65) Prior Publication Data

US 2014/0049235 A1   Feb. 20, 2014

(30) Foreign Application Priority Data

Aug. 14, 2012   (CN) .......................... 2012 1 0288345

(51) Int. Cl.
G05F 1/00 (2006.01)
G05F 1/573 (2006.01)
G05F 1/46 (2006.01)

(52) U.S. Cl.
CPC ........................................ *G05F 1/46* (2013.01)
USPC ............ 323/271; 323/277; 323/282; 323/288

(58) Field of Classification Search
CPC ......... G05F 1/46; G05F 1/4011; H02M 3/158
USPC .......... 323/222–225, 271–277, 282–285, 288
See application file for complete search history.

(56) References Cited

U.S. PATENT DOCUMENTS

| | | | | |
|---|---|---|---|---|
| 3,147,397 | A * | 9/1964 | Michaelson | 327/133 |
| 3,314,407 | A * | 4/1967 | Schneider | 123/406.59 |
| 3,890,537 | A * | 6/1975 | Park et al. | 315/208 |
| 5,359,280 | A * | 10/1994 | Canter et al. | 323/282 |
| 6,215,288 | B1 * | 4/2001 | Ramsey et al. | 323/224 |
| 6,292,120 | B1 * | 9/2001 | Painchaud et al. | 341/139 |
| 6,987,380 | B1 * | 1/2006 | Lee | 323/285 |
| 7,385,379 | B2 * | 6/2008 | Aioanei | 323/284 |
| 7,960,953 | B2 * | 6/2011 | Inoue | 323/273 |
| 8,063,588 | B1 * | 11/2011 | Ribarich et al. | 315/360 |
| 8,373,395 | B2 * | 2/2013 | Yashiki | 323/222 |
| 2002/0183990 | A1 * | 12/2002 | Wasynczuk et al. | 703/2 |
| 2004/0114400 | A1 * | 6/2004 | Shinba | 363/56.02 |
| 2006/0028191 | A1 * | 2/2006 | Lee | 323/285 |
| 2006/0125454 | A1 * | 6/2006 | Chen et al. | 323/282 |
| 2006/0198167 | A1 * | 9/2006 | Nakamura | 363/16 |
| 2007/0132462 | A1 * | 6/2007 | Laraia et al. | 324/685 |
| 2007/0145960 | A1 * | 6/2007 | Hatano et al. | 323/282 |

(Continued)

*Primary Examiner* — Timothy J Dole
*Assistant Examiner* — Yusef Ahmed
(74) *Attorney, Agent, or Firm* — Perkins Coie LLP

(57) ABSTRACT

A switching regulator including: a power stage having a first power switch and a second power switch coupled in series; a filter circuit having an inductor and an output capacitor; a feedback circuit configured to provide a feedback signal indicating an output voltage of the regulator; and a control circuit configured to provide a switching signal to control the ON and OFF of the first power switch so as to regulate the energy supplied to a load; wherein the control circuit has a peak current generator configured to generate a peak current signal, wherein the gain of a variation of the peak current signal between the contiguous switching cycles is less than one.

4 Claims, 6 Drawing Sheets

(56) References Cited

U.S. PATENT DOCUMENTS

| | | | |
|---|---|---|---|
| 2009/0012770 A1* | 1/2009 | Wasynczuk et al. | 703/16 |
| 2009/0115392 A1* | 5/2009 | Shimizu | 323/283 |
| 2009/0304279 A1* | 12/2009 | Mori | 382/169 |
| 2011/0109281 A1* | 5/2011 | Yabuzaki et al. | 323/210 |
| 2011/0193543 A1 | 8/2011 | Nguyen | |
| 2012/0112795 A1* | 5/2012 | Wang et al. | 327/86 |
| 2013/0215649 A1* | 8/2013 | Huang et al. | 363/21.17 |
| 2013/0294118 A1* | 11/2013 | So et al. | 363/21.16 |
| 2013/0301311 A1* | 11/2013 | Wang et al. | 363/21.13 |

\* cited by examiner

US 8,941,367 B2

SWITCHING REGULATOR AND THE METHOD OF GENERATING A PEAK CURRENT SIGNAL FOR THE SWITCHING REGULATOR

CROSS-REFERENCE TO RELATED APPLICATION(S)

This application claims priority to and the benefit of Chinese Patent Application No. 201210288345.2, filed Aug. 14, 2012, which is incorporated herein by reference in its entirety.

TECHNICAL FIELD

The present invention relates generally to voltage regulators, and more particularly but not exclusively to switching regulators.

BACKGROUND

A common method to improve the efficiency of a switching regulator is to decrease the frequency under light load. But low frequency may result in large ripple in an output voltage of the switching regulator and may influence the performance of the switching regulator. For example, in a high side buck converter, low frequency may slow the dynamic response because the output voltage could not be detected timely. Thus, there should be a lower limit of the switching frequency. The conventional way to maintain the switching frequency above the lower limit is to decrease a peak current signal as the load decreases. The peak current signal may be adjusted according to a frequency signal, e.g. a switching period, an off time or an on time of the switching regulator. But in that case, sub-harmonic oscillation may be caused.

SUMMARY

It is an object of the present invention to eliminate the sub-harmonic oscillation in the switching regulator having peak current signal adjusted according to the frequency signal.

In accomplishing the above and other objects, there has been provided, in accordance with an embodiment of the present invention, a switching regulator comprising: a power stage having a first power switch and a second power switch coupled in series to receive an input voltage; a filter circuit having an inductor and an output capacitor, an output signal is provided across the output capacitor; a feedback circuit having an input terminal configured to receive the output voltage, and an output terminal configured to provide a feedback signal indicating the output voltage based on the output voltage; and a control circuit configured to provide a switching signal to control the ON and OFF of the first power switch so as to regulate the energy supplied to a load based on a current flowing through the first power switch and the feedback signal; wherein the control circuit has a peak current generator configured to generate a peak current signal, and wherein the gain of the variation of the peak current signal between the contiguous switching cycles is less than one.

Furthermore, there has been provided, in accordance with an embodiment of the present invention, a method for controlling a switching regulator, wherein the switching regulator comprises a control circuit configured to regulate energy supplied to a load by controlling the ON and OFF of a first power switch and a second power switch. The method comprises: generating a peak current signal based on a peak control signal; and controlling the gain of the variation of the peak current signal between the contiguous switching cycles to less than one.

In addition, there has been provided, in accordance with an embodiment of the present invention, a method for controlling a switching regulator, wherein the switching regulator comprises a control circuit configured to regulate energy supplied to a load by controlling the ON and OFF of a first power switch and a second power switch. The method comprises: charging a filter capacitor to reach a reference signal; coupling a peak capacitor in parallel to the filter capacitor, and whereby the charges stored in the filter capacitor is proportionally distributed between the two capacitors; and discharging the peak capacitor and the filter capacitor to get a peak current signal decreasing with a preset slope; wherein the gain of the variation of the peak current signal between the contiguous switching cycles is controlled to be less than one.

The use of the same reference label in different drawings indicates same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention. Persons of ordinary skill in the art should know that the first power switch is also referred as a high-side switch and the second power switch is also referred as a low-side switch.

Figure 1:
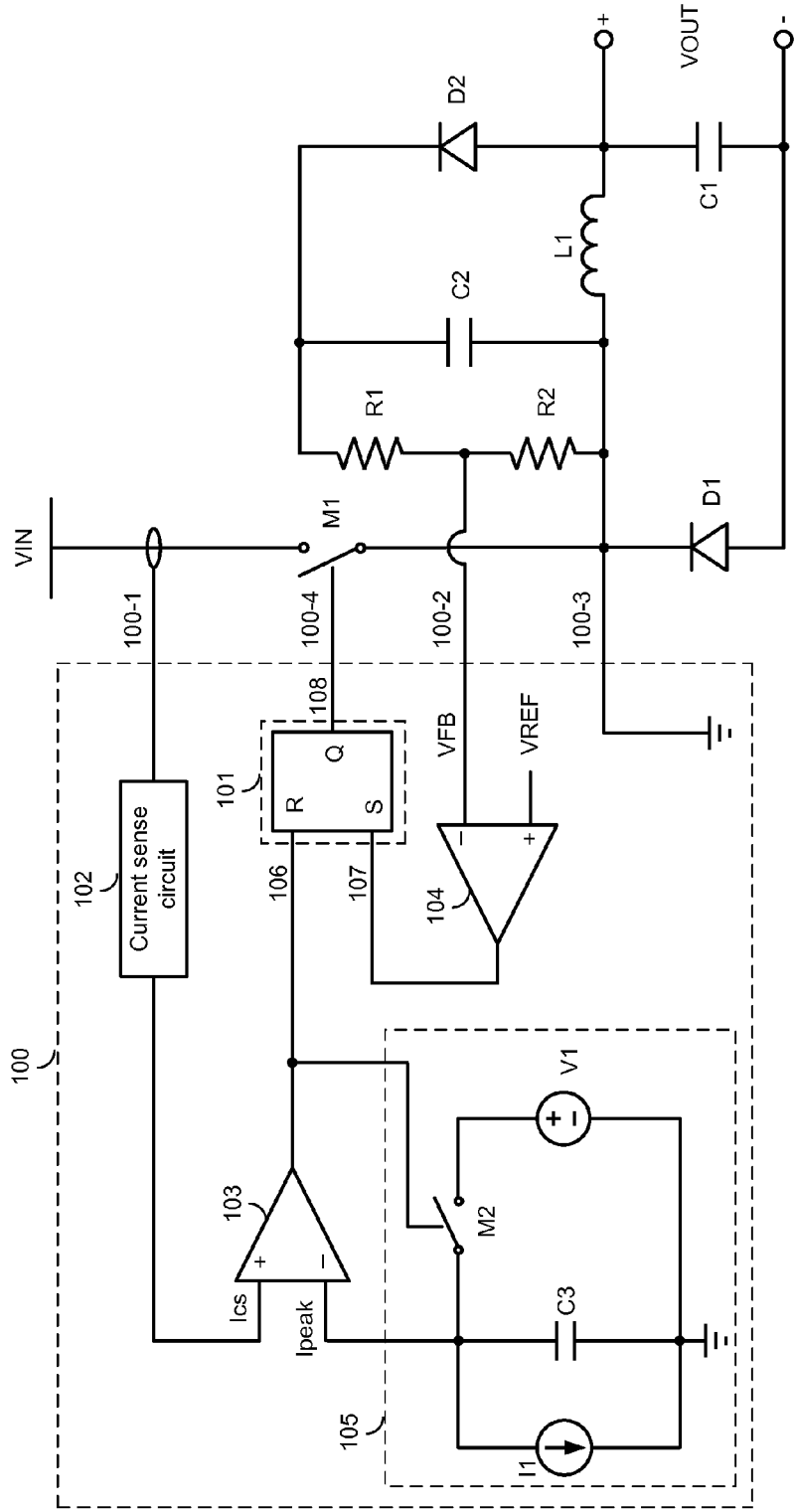
FIG. 1 schematically shows a prior art high side buck converter.

FIG. 1 schematically shows a prior art high side buck converter. As shown in FIG. 1, the prior art high side buck converter comprises: a power stage comprising a first power switch M1 and a second power switch D1 coupled in series to receive an input voltage VIN; a filter circuit comprising an inductor L1 and an output capacitor C1, wherein an output signal VOUT is provided across the output capacitor C1; a feedback circuit comprising a feedback diode D2, a feedback capacitor C2, a first feedback resistor R1 and a second feedback resistor R2, wherein the first feedback resistor R1 and the second feedback resistor R2 are coupled in series between a cathode terminal of the feedback diode D2 and a first terminal of the inductor L1, an anode terminal of the feedback diode D2 is coupled to a second terminal of the inductor L1, a first terminal of the feedback capacitor C2 is coupled to the cathode terminal of the feedback diode D2, a second terminal of the feedback capacitor C2 is coupled the first terminal of the inductor L1, and wherein the feedback circuit provides a feedback signal VFB indicating the output voltage VOUT at the connection of the resistors R1 and R2; a control circuit 100 having a first input terminal 100-1, a second input terminal 100-2, a ground terminal 100-3 and an output terminal 100-4, wherein the first input terminal 100-1 is coupled to the first power switch M1 to detect a current flowing through the first power switch M1, a second input terminal 100-2 is coupled to the connection of the resistors R1 and R2 to receive the feedback signal VFB, and the ground terminal 100-3 is coupled to the connection of the first power switch M1 and the second power switch D1, and wherein based on the current flowing through the first power switch M1 and the feedback signal VFB, the control circuit 100 provides a switching signal 108 at the output terminal to control the ON and OFF of the first power switch M1 so as to regulate the energy supplied to a load.

In the example of FIG. 1, the control circuit 100 comprises: a current sense circuit 102 coupled to the first power switch M1, wherein based on the current flowing through the first power switch M1, the current sense circuit 102 provides a current sense signal Ics; a peak comparator 103 having a first input terminal (non-inverting input terminal) coupled to the current sense circuit 102 to receive the current sense signal Ics, a second input terminal (inverting input terminal) configured to receive a peak current signal Ipeak, and an output terminal configured to generate a reset signal 106 based on the current sense signal Ics and the peak current signal Ipeak; a peak current generator 105 having an input terminal coupled to the output terminal of the peak comparator 103 to receive the reset signal 106 and an output terminal configured to provide the peak current signal Ipeak based on the reset signal 106; a feedback comparator 104 having a first input terminal (inverting terminal) coupled to the connection of the resistors R1 and R2 to receive the feedback signal VFB, a second input terminal (non-inverting terminal) configured to receive a reference signal VREF, and an output terminal configured to provide a set signal 107 based on the feedback signal VFB and the reference signal VREF; a RS flip-flop 101 having a set terminal "S" coupled to the feedback comparator 104 to receive the set signal 107, a reset terminal "R" coupled to the peak comparator 103 to receive the reset signal 106, and an output terminal "Q" configured to provide the switching signal 108 to control the ON and OFF of the first power switch M1 based on the set signal 107 and the reset signal 106.

Figure 2:
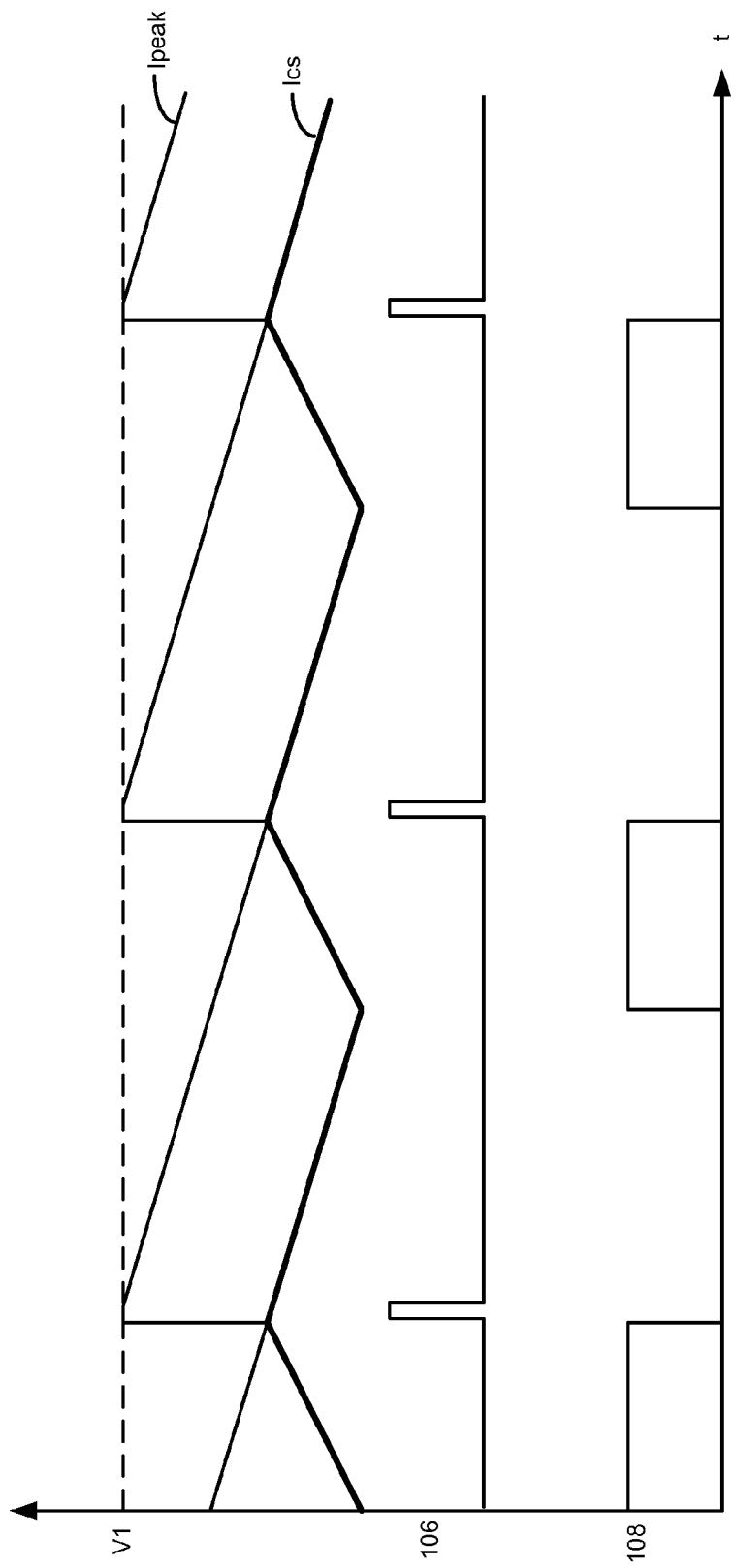
FIG. 2 shows the waveforms of the peak current signal Ipeak, the current sense signal Ics, the reset signal 106 and the switching signal 108.

FIG. 2 shows the waveforms of the peak current signal Ipeak, the current sense signal Ics, the reset signal 106 and the switching signal 108. The operation of the control circuit 100 is described with reference to FIGS. 1 and 2. When first power switch M1 is turned ON, the current flowing through the first power switch M1 increases, resulting in the increase of the current sense signal Ics. When the current sense signal Ics increases to the peak current signal Ipeak, the peak comparator 103 flips to reset the RS flip-flop 101 and thereby to turn OFF the first power switch M1. The second power switch D1 is ON after the first power switch M1 is turned OFF. Then the output voltage VOUT decreases, so does the feedback signal VFB. When the feedback signal VFB decreases to the reference signal VREF, the feedback comparator 104 flips to set the RS flip-flop 101 and thereby to turn ON the first power switch M1.

To improve the efficiency under light load, the high side buck converter in FIG. 1 regulates the peak current signal Ipeak according to an OFF time of the first power switch M1 to reduce the switching frequency of the high side buck converter under light load. Persons of ordinary skill in the art should know that other signals, e.g. an ON time of the first power switch M1, the switching signal 108 and so on, could be adopted to regulate the peak current signal too. In FIG. 1, the peak current generator 105 comprises a first current source I1, a first switch M2, a peak capacitor C3 and a first voltage source V1 coupled as shown, wherein the peak current signal Ipeak is provided across the peak capacitor C3. The value of the peak current signal Ipeak is proportional to the OFF time of the first power switch M1. In the example of FIG. 1, the lighter the load, the longer the OFF time of the first power switch M1, and the lower the peak current signal Ipeak.

The operation of the peak current generator 105 is: when current sense signal Ics reaches the peak current signal Ipeak, the peak comparator 103 flips, then the first switch M2 is turned ON by the reset signal 106, and the peak capacitor C3 is coupled in parallel to the first voltage source V1, resulted in the value of the peak current signal Ipeak being equal to the value of the first voltage source V1. The reset signal 106 is a pulse signal and the pulse is short. At the end of the pulse of the reset signal 106, the first switch M2 is turned OFF. Then, the first current source I1 discharges the peak capacitor C3, and the peak current signal Ipeak decreases. The waveform of the peak current signal Ipeak is shown in FIG. 2. Persons of ordinary skill in the art should know that the first switch M2 could be controlled by any signal having pulses at the moment the first power switch M1 is turned OFF.

Because of the peak current generator 105, there will be sub-harmonic oscillation in the high side buck converter in FIG. 1 when a current flowing through the inductor L1 is disturbed. For example, assuming that the peak current signal Ipeak increases ΔIpeak1, the rising time of the current flowing through the inductor L1 increases. Thus the OFF time Toff of the first power switch M1 will increase to balance the energy provided to the load. In other words, the increase of the peak current signal Ipeak will result in the increase of the OFF time Toff of the first power switch M1. Because the peak current signal Ipeak generated by the peak current generator 105 is inversely proportional to the OFF time Toff of the first power switch M1, the increase of the OFF time Toff of the first power switch M1 of the current switching cycle results in the decrease of the peak current signal Ipeak of the next switching cycle. Assuming that the peak current signal Ipeak decreases ΔIpeak2, the rising time of the current flowing through the inductor L1 decreases. Thus the OFF time Toff of the first power switch M1 will decrease to balance the energy provided to the load. In other words, the decrease of the peak current signal Ipeak results in the decrease of the OFF time Toff of the first power switch M1. As mentioned before, the peak current signal Ipeak is inversely proportional to the OFF time Toff of the first power switch M1. So, the decrease of the OFF time Toff of the first power switch M1 of the current switching cycle results in the increase of the peak current signal Ipeak of the next switching cycle. Again, the increase of the peak current signal Ipeak causes the increase of the OFF time Toff of the first power switch. The operation repeats, and causes the sub-harmonic oscillation to influence the performance of the converter.

In a conclusion, the increase ΔIpeak1 of the peak current signal Ipeak of the current switching cycle causes the decrease ΔIpeak2 of the peak current signal Ipeak of the next switching cycle, and then causes the increase ΔIpeak3 of the peak current signal Ipeak of the third switching cycle and so on. The gain of the variation of the peak current signal Ipeak between the contiguous switching cycles is:

$$\text{Gain} = \left|\frac{\Delta Ipeak2}{\Delta Ipeak1}\right| = \left|\frac{\Delta Ipeak2}{\Delta Toff} \times \frac{\Delta Toff}{\Delta Ipeak1}\right| \quad (1)$$

In the example of FIG. 1, assuming the increase ΔIpeak1 of the peak current signal Ipeak causes the increase ΔVOUT of the output voltage VOUT. Thus the increase ΔToff of the OFF time Toff could be represented as:

$$\Delta Toff = \frac{\Delta VOUT}{a} = \frac{\Delta Ipeak1 \times (Reqc + Resr)}{a} \approx \frac{\Delta Ipeak1 \times Resr}{a} \quad (2)$$

Wherein a is the discharging speed of the capacitor C2, Reqc is the equivalent resistance of the capacitor C1 and Resr is the ESR (Equivalent Series Resistance) resistance of the capacitor C1. Reqc is much smaller than Resr, and could be ignored here. a may be written as:

$$a = \left|\frac{Vc2}{t}\right| \quad (3)$$

Wherein Vc2 is the voltage across the capacitor C2. Substitution of Eqs. (2) and (3) into Eq. (1) and solution for gain of the variation of the peak current signal Ipeak between the contiguous switching cycles yields:

$$\text{Gain} = \frac{b \times Resr}{a} \quad (4)$$

Wherein b could be represented by:

$$b = \frac{\Delta Ipeak}{\Delta Toff} = -\frac{I1}{C3} \quad (5)$$

In Eq. (4), when |Gain|>1, sub-harmonic oscillation happens. Generally, in a conventional switching regulator with peak current signal Ipeak regulated according to the frequency signal, e.g. the OFF time, the ON time, the switching cycle and so on, |Gain|>1. If |Gain|<1, the sub-harmonic oscillation could be suppressed. And as seen from Eq. (1), |Gain|<1 may be realized by decreasing a, b or Resc.

Figure 3:
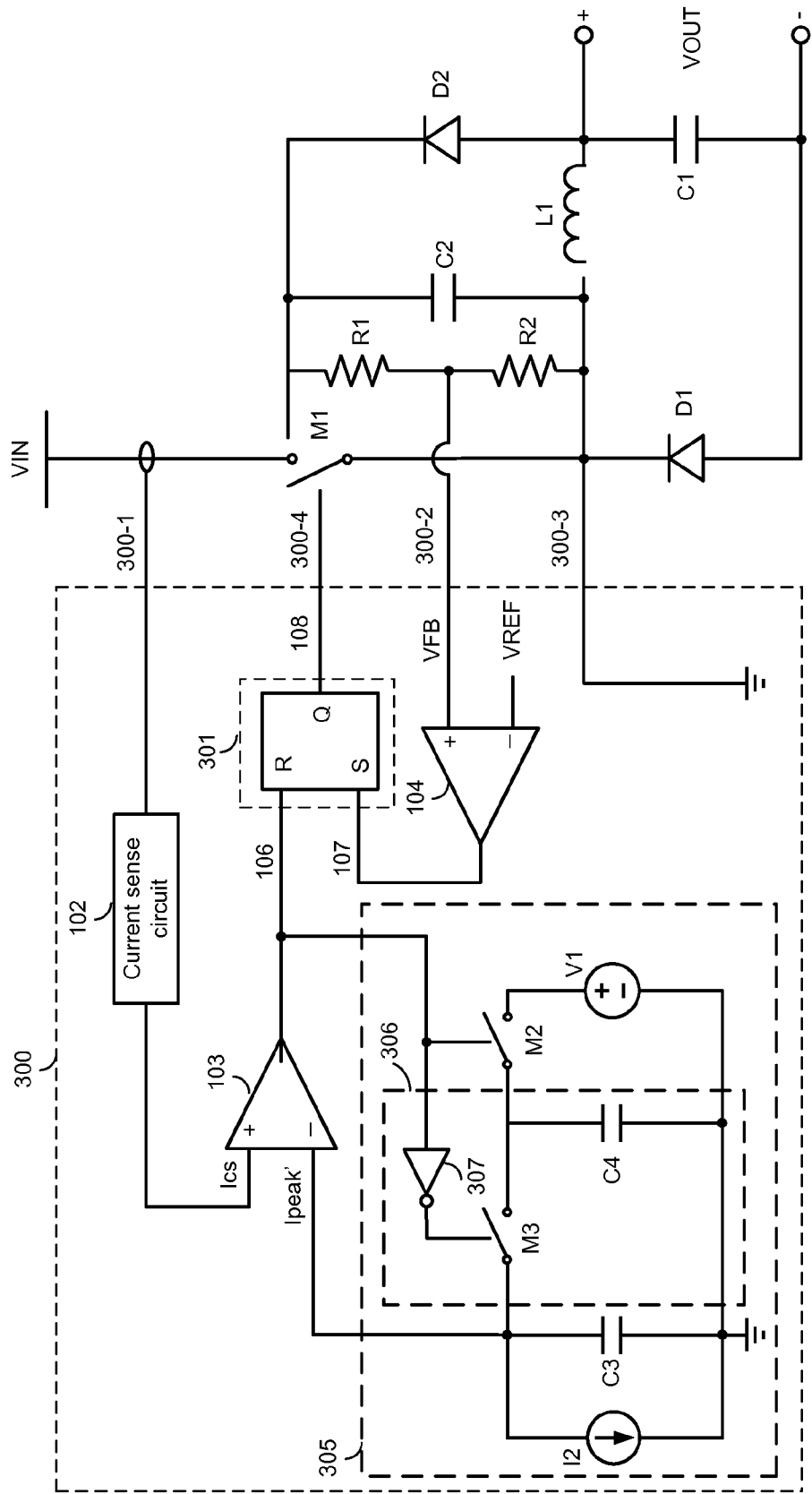
FIG. 3 schematically shows a switching regulator in accordance with an embodiment of the present invention.

FIG. 3 schematically shows a switching regulator in accordance with an embodiment of the present invention. In the example of FIG. 3, |Gain|<1 and the sub-harmonic oscillation is suppressed. The switching regulator comprises: a power stage comprising a first power switch M1 and a second power switch D1 coupled in series to receive an input voltage VIN; a filter circuit comprising an inductor L1 and an output capacitor C1, wherein an output signal VOUT is provided across the output capacitor C1; a feedback circuit having an input terminal configured to receive the output voltage VOUT, and an output terminal configured to provide a feedback signal VFB indicating the output voltage VOUT based on the output voltage; a control circuit 300 having a first input terminal 300-1 coupled to the first power switch M1 to detect a current flowing through the first power switch M1, a second input terminal 300-2 coupled to the output terminal of the feedback circuit to receive the feedback signal VFB, a ground terminal 300-3 coupled to the connection of the first power switch M1 and the second power switch D1, and an output terminal 300-4 configured to provide a switching signal 108 to control the ON and OFF of the first power switch M1 so as to regulate the energy supplied to a load based on the current flowing through the first power switch M1 and the feedback signal VFB.

In the example of FIG. 3, the switching regulator comprises a high side buck converter. The feedback circuit comprises a feedback diode D2, a feedback capacitor C2, a first feedback resistor R1 and a second feedback resistor R2, coupled as shown. Persons of ordinary skill in the art should know that the control circuit 300 may be applied in other switching regulator, e.g. BUCK converter, BOOST converter or BUCK-BOOST converter and so on. When the control circuit 300 is applied in a general BUCK converter, the ground terminal 300-3 is coupled to a reference ground, and the feedback circuit comprises a resistance network coupled between the output voltage VOUT and the reference ground to provide a feedback circuit VFB indicating the output voltage VOUT. So any other circuits may feedback an emulated output voltage VOUT could be used without detracting from the merits of the present invention.

In the example of FIG. 3, the control circuit 300 comprises: a current sense circuit 102 coupled to the first power switch M1 to provide a current sense signal Ics based on the current flowing through the first power switch M1; a peak comparator 103 having a first input terminal (non-inverting input terminal) coupled to the current sense circuit to receive the current sense signal Ics, a second input terminal (inverting input terminal) configured to receive a peak current signal Ipeak', and an output terminal configured to provide a reset signal 106 based on the current sense signal Ics and the peak current signal Ipeak'; a peak current generator 305 having an input terminal configured to receive a peak control signal, a ground terminal connected to the reference ground and an output terminal configured to provide the peak current signal Ipeak' based on the peak control signal; a feedback comparator 104 having a first input terminal (inverting terminal) configured to receive the feedback signal VFB, a second input terminal (non-inverting terminal) configured to receive a reference signal VREF and an output terminal configured to provide a set signal 107 based on the feedback signal VFB and the reference signal VREF; a logic circuit 301 having a set terminal "S" coupled to the feedback comparator 104 to receive the set signal 107, a reset terminal "R" coupled to the peak comparator 103 to receive the reset signal 106, and an output terminal "Q" configured to provide the switching signal 108 to control the ON and OFF of the first power switch M1 based on the set signal 107 and the reset signal 106.

In one embodiment, the peak control signal comprises the reset signal 106.

In one embodiment, the logic circuit 301 comprises a RS flip-flop.

In the example of FIG. 3, the first power switch M1 comprises a MOSFET (Metal Oxide Semiconductor Field Effect Transistor) and the second power switch D1 comprises a diode device. Persons of ordinary skill in the art should know that the first power switch M1 and the second power switch D1 in other embodiments may comprise other semiconductor devices, e.g. MOSFET, bipolar devices and so on.

The circuit in FIG. 3 regulates the peak current signal according to the OFF time of the first power switch M1. The peak current generator 305 comprises: a second current source I2; a peak capacitor C3 coupled in parallel to the second current source I2, wherein the peak current signal Ipeak' is provided across the peak capacitor C3; a low pass filter 306 having a first terminal, a second terminal, a third terminal and a control terminal, wherein the first terminal and the second terminal are respectively coupled to the two terminals of the peak capacitor C3, and the control terminal is configured to receive the reset signal 106; a first switch M2 having a first terminal coupled to the third terminal of the low pass filter 306, a second terminal, and a control terminal configured to receive the reset signal 106; and a first voltage source V1 having a first terminal coupled to the second terminal of the first switch M2 and a second terminal coupled to the second terminal of the low pass filter 306; wherein the peak current signal Ipeak' is provided across the peak capacitor C3. The value of the peak current signal Ipeak' is inversely proportional to the OFF time of the first power switch M1.

In one embodiment, the low pass filter 306 comprises: a second switch M3 having a first terminal coupled to the first terminal of the low pass filter 306, a second terminal coupled to the third terminal of the low pass filter 306, and a control terminal configured to receive the reset signal 106; and a filter capacitor C4 having a first terminal coupled to the third terminal of the low pass filter 306, and a second terminal coupled to the second terminal of the low pass filter 306.

In one embodiment, the low pass filter 306 further comprises an inverter 307 having an input terminal coupled to the input terminal of the peak comparator 103 to receive the reset signal 106, and an output terminal, coupled to the second switch M3 to provide the inversed reset signal.

In one embodiment, the first switch M2 and the second switch M3 comprise controllable semiconductor devices, e.g. MOSFET, bipolar device and so on.

Figure 4:
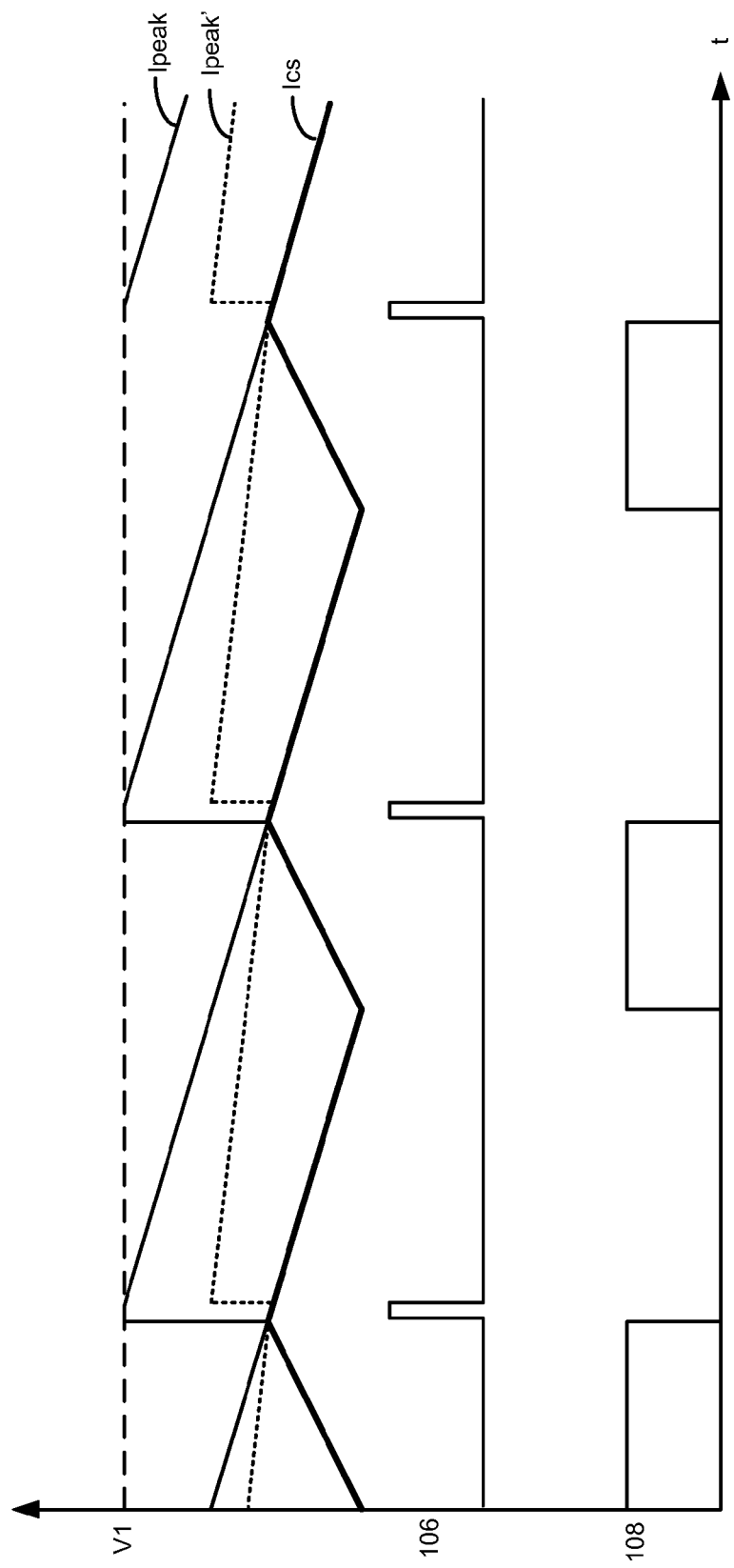
FIG. 4 shows the waveform of the peak current signal Ipeak in FIG. 1, and the waveforms of the peak current signal Ipeak', the current sense signal Ics, the reset signal 106 and the switching signal 108 in FIG. 3.

FIG. 4 shows the waveforms of the peak current signal Ipeak in FIG. 1, the waveforms of the peak current signal Ipeak', the current sense signal Ics, the reset signal 106 and the switching signal 108 in FIG. 3. The operation of the peak current generator 305 is: when current sense signal Ics reaches the peak current signal Ipeak, the peak comparator 103 flips, then the first switch M2 is turned ON by the reset signal 106, and the peak capacitor C3 is coupled in parallel to the first voltage source V1, resulted in the value of the peak current signal Ipeak being equal to the value of the first voltage source V1. The reset signal 106 is a pulse signal and the pulse is short. At the end of the pulse of the reset signal 106, the first switch M2 is turned OFF. The control signal of the second switch M3 is reverse to the reset signal 106. So the second switch M3 is turned ON when the first switch M2 is turned OFF. Then the charges stored in the peak capacitor C3 is proportionally distributed between the filter capacitor C4 and the peak capacitor C3. Meanwhile, the second current source I2 discharges the capacitors C3 and C4, so that the peak current signal Ipeak' decreases as shown in FIG. 4. Compared with the peak current signal Ipeak, the decreasing speed of the peak current signal Ipeak' is much lower, because the value of b in the circuit of FIG. 3 is smaller than the value of b in the circuit of FIG. 1. The value b in the circuit of FIG. 3 is:

$$b = \frac{\Delta Ipeak'}{\Delta Toff} = -\frac{I2}{C3+C4} \quad (6)$$

In Eq. (6), the value of b, which is the variation ΔIpeak' of the peak current signal Ipeak' caused by the variation ΔToff of the OFF time of the first power switch M1, could be regulated by changing the value of the second current source I2, the capacitors C3 and C4. So that the gain of the variation of the peak current signal Ipeak between the contiguous switching cycles could be controlled to be less than one.

In a conclusion, the sub-harmonic oscillation could be eliminated by controlling the gain of the variation of the peak current signal Ipeak between the contiguous switching cycles to be less than one.

Persons of ordinary skill in the art should know that the first switch M2 and the second switch M3 may be controlled by other signals having pulses every time the first power switch M1 is turned OFF. Meanwhile, the peak current generator 305 may be employed in any switching regulators which regulate the peak current signal according to the OFF time or the switching cycle of the first power switch M1.

Figure 5:
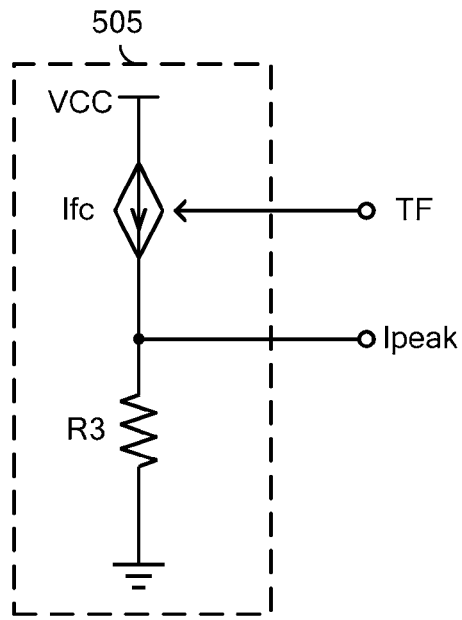
FIG. 5 schematically shows a peak current generator 505 in accordance with an embodiment of the present invention.

As mentioned before, the peak current signal could be generated based on other frequency related signals, e.g. the ON time, the duty cycle or the switching cycle period of the first power switch M1. The peak current generator may be realized by frequency controlled current source. FIG. 5 schematically shows a peak current generator 505 in accordance with an embodiment of the present invention. The peak current generator 505 comprises: a frequency controlled current source Ifc having a control terminal configured to receive a frequency signal TF indicative of the frequency of the switching regulator, a first terminal configured to receive an internal power VCC, and a second terminal configured to provide a current based on the frequency signal TF; and a peak resistor R3 having a first terminal coupled to the second terminal of the frequency controlled current source Ifc to receive the current, and a second terminal coupled to the reference ground. The current provided by the frequency controlled current source Ifc flows through the resistor R3 to generate a peak current signal Ipeak.

In one embodiment, the frequency signal TF is proportional to the OFF time of the first power switch M1. The current provided by the frequency controlled current source Ifc is inversely proportional to the OFF time of the first power switch M1, and the frequency signal TF as well.

In one embodiment, the frequency signal TF represents the duty cycle of the switching regulator. The current provided by the frequency controlled current source Ifc is directly proportional to the value of the frequency signal TF. In other words, the current provided by the frequency controlled current source Ifc is directly proportional to the duty cycle of the switching regulator.

Figure 6:
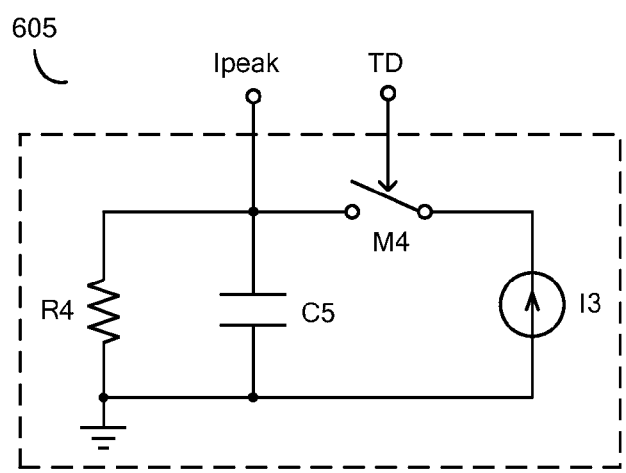
FIG. 6 schematically shows a peak current generator 605 in accordance with an embodiment of the present invention.

FIG. 6 schematically shows a peak current generator 605 in accordance with an embodiment of the present invention. The peak current generator 605 comprises: a capacitor C5 having a first terminal coupled to the reference ground, and a second terminal configured to provide the peak current signal Ipeak; a resistor R4 coupled in parallel with the capacitor C5; a third switch M4 having a control terminal configured to receive a square signal TD, a first terminal coupled to the second terminal of the capacitor C5, and a second terminal; and a third current source I3 having a first terminal coupled to the reference ground, and a second terminal coupled to the second terminal of the third switch M4.

Figure 7:
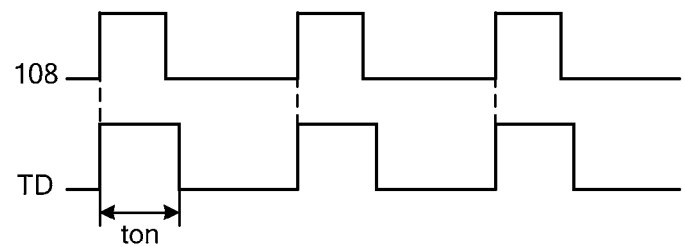
FIG. 7 shows the waveform of the switching signal 108 in FIG. 1 and the waveform of the square signal TD in FIG. 6.

The peak current generator 605 may be employed in the switching regulator of FIG. 3. FIG. 7 shows the waveform of the switching signal 108 in FIG. 1 and the waveform of the square signal TD in FIG. 6. In one embodiment, the first power switch M1 is controlled to be ON when the switching signal 108 is logical high and is controlled to be OFF when the switching signal 108 is logical low. The square signal TD synchronizes with the switching signal 108. As shown in FIG. 7, the square signal TD flips to be logical high at the moment the first switch M1 is turned ON, and keeps high for a preset time length Ton. The preset time length Ton may be adjusted in different applications.

The operation of the peak current generator 605 is described with reference to the switching regulator in FIG. 3. When the first power switch M1 is turned ON, the third switch M4 is turned OFF. Then the third current source I3 supplies a current to the resistor R4 and meanwhile charges the capacitor C5; after the time length Ton, the third switch M4 is turned OFF. Then the capacitor C5 supplies current to the resistor R4. So the peak current signal Ipeak can be written as:

$$Ipeak = I3 \times R4 \times \frac{ton}{T} \tag{7}$$

Wherein T is the switching cycle of the switching regulator. When the third current source I3 and the resistor R4 are fixed, the value of the peak current signal Ipeak is inversely proportional to the switching cycle T of the switching regulator. In one embodiment, the proportion of the peak current signal Ipeak to the switching cycle T of the switching regulator may be adjusted by changing the value of the third current source I3, the resistor R4 and the time length Ton of the square signal TD, so that the gain of the variation of the peak current signal Ipeak between the contiguous switching cycles could be controlled to be less than one to eliminate the sub-harmonic oscillation.

Persons of ordinary skill in the art should know that the peak current generator 305, the peak current generator 505 and the peak current generator 605 could be employed in switching regulators like BUCK converter, BOOST converter, BUCK-BOOST converter and so on.

Figure 8:
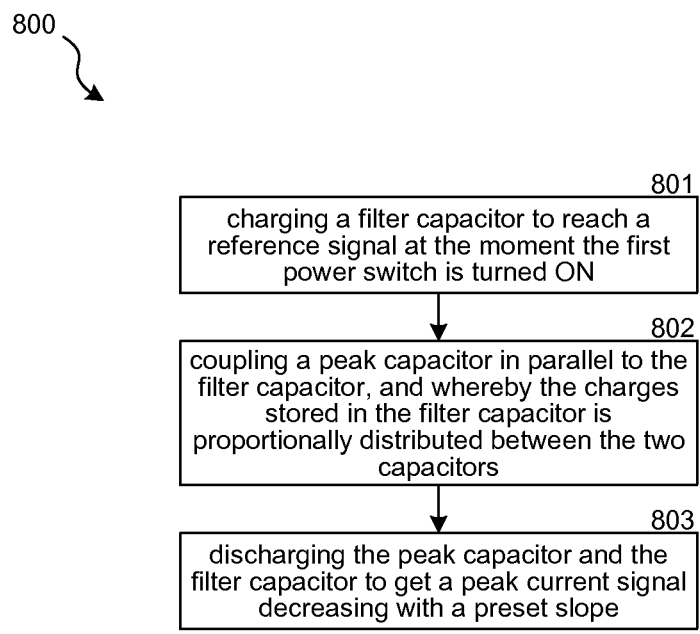
FIG. 8 shows a flowchart of a method 800 of generating a peak current signal for a switching regulator in accordance with an embodiment of the present invention.

FIG. 8 shows a flowchart of a method 800 of generating a peak current signal for a switching regulator like BUCK converter, BOOST converter, BUCK-BOOST converter and so on in accordance with an embodiment of the present invention. The switching regulator comprises a control circuit configured to regulate the energy supplied to a load by controlling the ON and OFF of a first power switch and a second power switch. In each switching cycle, energy is supplied to the load when the first power switch is turned ON, and the second power switch is turned OFF. The method 800 comprises:

Step 801, charging a filter capacitor to reach a reference signal at the moment the first power switch is turned ON;

Step 802, coupling a peak capacitor in parallel to the filter capacitor, and whereby the charges stored in the filter capacitor is proportionally distributed between the two capacitors;

Step 803, discharging the peak capacitor and the filter capacitor to get a peak current signal decreasing with a preset slope;

Wherein the gain of the variation of the peak current signal between the contiguous switching cycles is controlled to be less than one.

An effective technique for switching regulator has been disclosed. While specific embodiments of the present invention have been provided, it is to be understood that these embodiments are for illustration purposes and not limiting. Many additional embodiments will be apparent to persons of ordinary skill in the art reading this invention.

We claim:

1. A switching regulator, comprising:
a power stage having a first power switch and a second power switch coupled in series to receive an input voltage;
a filter circuit having an inductor and an output capacitor, an output signal is provided across the output capacitor;
a feedback circuit having an input terminal configured to receive the output voltage, and an output terminal configured to provide a feedback signal indicating the output voltage based on the output voltage; and
a control circuit configured to provide a switching signal to control the ON and OFF of the first power switch so as to regulate the energy supplied to a load based on a current flowing through the first power switch and the feedback signal; wherein
the control circuit has a peak current generator configured to generate a peak current signal, and wherein a gain of the variation of the peak current signal between contiguous switching cycles is less than one; wherein
the peak current generator comprises:
a current source;
a peak capacitor coupled in parallel to the current source, the peak capacitor having two terminals;
a first switch having a control terminal, a first terminal and a second terminal, the control terminal configured to receive a reset signal;
an inverter having an input terminal configured to receive the reset signal, and an output terminal configured to provide a reversed reset signal;
a second switch having a control terminal coupled to the inverter to receive the reversed reset signal, a first terminal coupled to the first terminal of the peak capacitor, and a second terminal coupled to a first terminal of the first switch;
a filter capacitor having a first terminal coupled to the first terminal of the first switch, and a second terminal coupled to a reference ground; and
a first voltage source having a first terminal coupled to the second terminal of the first switch, and a second terminal coupled to the reference ground; wherein
the filter capacitor is of a same capacitance as the peak capacitor, and the peak current signal is provided across the peak capacitor.

2. A switching regulator, comprising:
a power stage having a first power switch and a second power switch coupled in series to receive an input voltage;
a filter circuit having an inductor and an output capacitor, an output signal is provided across the output capacitor;
a feedback circuit having an input terminal configured to receive the output voltage, and an output terminal configured to provide a feedback signal indicating the output voltage based on the output voltage; and
a control circuit configured to provide a switching signal to control the ON and OFF of the first power switch so as to regulate the enemy supplied to a load based on a current flowing through the first power switch and the feedback signal; wherein
the control circuit has a peak current generator configured to generate a peak current signal, and wherein a gain of the variation of the peak current signal between contiguous switching cycles is less than one; wherein
the peak current generator comprises:
a frequency controlled current source having a control terminal configured to receive a frequency signal indicative of the frequency of the switching regulator, a first terminal configured to receive an internal power, and a second terminal configured to provide a current based on the frequency signal; and a peak resistor having a first terminal coupled to the second terminal of the frequency controlled current source to receive the current, and a second terminal coupled to a reference ground, wherein the current provided by the frequency controlled current source flows through the peak resistor to generate the peak current signal.

3. The switching regulator of claim 2, wherein the current provided by the frequency controlled current source is inversely proportional to an OFF time of first power switch.

4. The switching regulator of claim 2, wherein the current provided by the frequency controlled current source is directly proportional to the duty cycle of the switching regulator.

* * * * *